US005595262A

United States Patent [19]
Martin

[11] Patent Number: 5,595,262
[45] Date of Patent: Jan. 21, 1997

[54] ELECTRICALLY OPERABLE OILER FOR MOTORCYCLE DRIVE CHAIN

[76] Inventor: Christopher M. Martin, Rte. #2 Box 362, Houston, Miss. 38851

[21] Appl. No.: 410,970

[22] Filed: Mar. 27, 1995

[51] Int. Cl.⁶ ................................... F16N 7/16
[52] U.S. Cl. .................. 184/15.2; 184/15.1; 184/6.26; 280/288.4; 474/91
[58] Field of Search ................ 184/15.1, 15.2, 184/15.3, 6.26, 11.5, 31, 105.1; 474/91, 92; 280/288.4; 180/219, 221, 231

[56] References Cited

U.S. PATENT DOCUMENTS

| | | |
|---|---|---|
| 3,530,957 | 9/1970 | Shaw et al. . |
| 3,720,289 | 3/1973 | Moldenhauer ................ 184/15.2 |
| 3,724,582 | 4/1973 | Wood ............................. 180/219 |
| 4,120,380 | 10/1978 | Mann . |
| 4,223,438 | 9/1980 | Kearison . |
| 4,353,163 | 10/1982 | Overbury et al. . |
| 4,456,149 | 6/1984 | Sciortino ....................... 222/333 |
| 4,801,088 | 1/1989 | Baker ............................. 222/333 |
| 5,020,637 | 6/1991 | Hoensada et al. . |
| 5,213,180 | 5/1993 | Masouek et al. . |

FOREIGN PATENT DOCUMENTS

| | | | |
|---|---|---|---|
| 0188623 | 1/1957 | Austria | 222/333 |
| 0238394 | 2/1965 | Austria | 222/333 |
| 1528839 | 2/1970 | Germany | 222/333 |
| 2946268 | 5/1981 | Germany | 280/288.4 |

Primary Examiner—Edward K. Look
Assistant Examiner—Christopher Verdier
Attorney, Agent, or Firm—Kevin A. Sembrat

[57] ABSTRACT

An electrically pumped oiler attachable to the frame of a conventional motorcycle is provided for discharging oil to a motorcycle drive chain, particularly while the motorcycle is in motion. The oiler has a conventional electrically operable pump mounted to or otherwise associated, preferably as a built-in inclusive unit, with a reservoir used for storage of oil. The pump is powered by the motorcycle battery or other power source, and is activated by an electrical switch, preferably mounted to one side of the handlebars of the motorcycle. The pump urges oil from the reservoir through a conduit for discharge of the oil, preferably as a widened spray or mist, toward the motorcycle drive chain, particularly at the point where the drive chain meets the drive sprocket on the rear axle of the motorcycle. The reservoir is easily refillable through a refill port by removing a sealing cap.

13 Claims, 3 Drawing Sheets

ELECTRICALLY OPERABLE OILER FOR MOTORCYCLE DRIVE CHAIN

BACKGROUND OF THE INVENTION

1. Field of the Invention

The present invention relates generally to an oiler for a motorcycle drive chain and, more particularly, to an electrically operable oiler for discharging oil to a motorcycle drive chain while the motorcycle is in motion.

2. Description of the Related Art

As is well-known in the art, the drive chain of a motorcycle must be properly lubricated with oil thereby to prolong the life of the chain and to minimize chain breaks, rust, and malfunction. Ideally, a light coating of oil is applied to the chain when the motorcycle will be at rest for a period of time. However, oiling the chain at appropriate times is either not always remembered by the operator, overlooked by the operator because of the hassle and messiness, or not convenient due to unavailability of an oiling can at the appropriate time.

Numerous attempts have been made to correct for the foregoing problems. In particular, U.S. Pat. No. 4,120,380, issued in the name of Mann, and which is hereby incorporated herein by reference in its entirety, addresses these problems and the relevant art and proposes solutions which involve an oiler that receives a replaceable pressurized can of oil having a plunger-operated discharge, which plunger is mechanically operated by a lever connected to a cable mounted to the handlebars of the motorcycle. Oil is discharged through a discharge tube attached to a plunger head. However, an oiler made in accordance with this reference is associated with several drawbacks. For example, the discharge tube attached to the plunger head must be inconveniently disconnected and reconnected to a replacement plunger head or a replacement pressurized can each time the pressured can is empty and must be replaced. Further, the attached discharge tube may interfere with the proper functioning of the plunger head. In addition, use of the pressurized can may emit gases which could harm the ozone. Moreover, with current designs of motorcycles, the mechanical cable and mounting bracket is bulky and therefore tends to be difficult to mount on handlebars, especially with an associated conventional clutch handle and/or brake handle getting in the way. Also, the mechanical cable tends to be difficult and distracting to operate while driving the motorcycle with the associated clutch handle and/or brake handle, and difficult to maintain to minimize malfunction due to a plurality of moving parts.

Consequently, a need has been felt for providing an oiler for a motorcycle drive chain that may be utilized while the motorcycle is in motion, wherein the oiler overcomes the problems such as bulkiness and malfunction commonly associated with mechanically operated oilers, inconvenience of disconnecting and reconnecting associated conduit when replacing empty cans, and pressurized oil cans.

SUMMARY OF THE INVENTION

It is therefore an object of the present invention to provide an improved oiler that stores oil in a refillable reservoir associated with an electric pump, such that the oil may be discharged to the motorcycle chain, particularly when the motorcycle is in motion.

It is a feature of the present invention to provide an electric pump with an associated refillable reservoir that is attachable to the frame of a motorcycle.

It is a further feature of the present invention to provide an improved oiler that is electrically operable through the activation of a compact electrical switch mounted to the handlebars of a motorcycle.

It is a further feature of the present invention to provide a sealable refill port through which replacement oil may be introduced into the reservoir, thereby eliminating the need to disconnect and reconnect an associated discharge conduit.

Briefly described according to one embodiment of the present invention, an electrically pumped oiler attachable to the frame of a conventional motorcycle is provided for discharging oil to a motorcycle drive chain, particularly while the motorcycle is in motion. The oiler has a conventional electrically operable pump mounted to or otherwise associated, preferably as a built-in inclusive unit, with a reservoir used for storage of oil. The pump is powered by the motorcycle battery or other power source, and is activated by an electrical switch, preferably mounted to one side of the handlebars of the motorcycle. The pump urges oil from the reservoir through a flexible conduit for discharge of the oil, preferably as a widened spray or mist, toward the motorcycle drive chain, particularly at the point where the drive chain meets the drive sprocket on the rear axle of the motorcycle. The reservoir is easily refillable through a refill port by removing a sealing cap.

In accordance with a preferred embodiment, an electrically pumped oiler attachable to a frame member of a motorcycle having handlebars for steering is provided for use in lubricating the motorcycle drive chain, wherein the oiler comprises: an electric pump which is activated by an electric switch, wherein the electric pump further comprises: a built-in reservoir in which oil is stored; a discharge port through which oil from the built-in reservoir is urged by the pump when activated by the electric switch; and a flexible conduit having a first and a second end, wherein the first end is attached to the discharge port of the electric pump, through which conduit the oil passes when the pump is activated, thereby to be discharged through the second end which is positioned in a predetermined position.

An advantage of the present invention is that the need to disconnect the discharge conduit from an empty oil can reservoir and subsequently to reconnect the discharge conduit to a replacement oil can reservoir is eliminated.

Another advantage of the present invention is that the reservoir of the present invention is refillable through a refill port by removing a sealing cap therefrom and pouring replacement oil therein.

Another advantage of the present invention is that the motorcycle drive chain may be more easily and conveniently oiled, particularly while the motorcycle is in motion.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
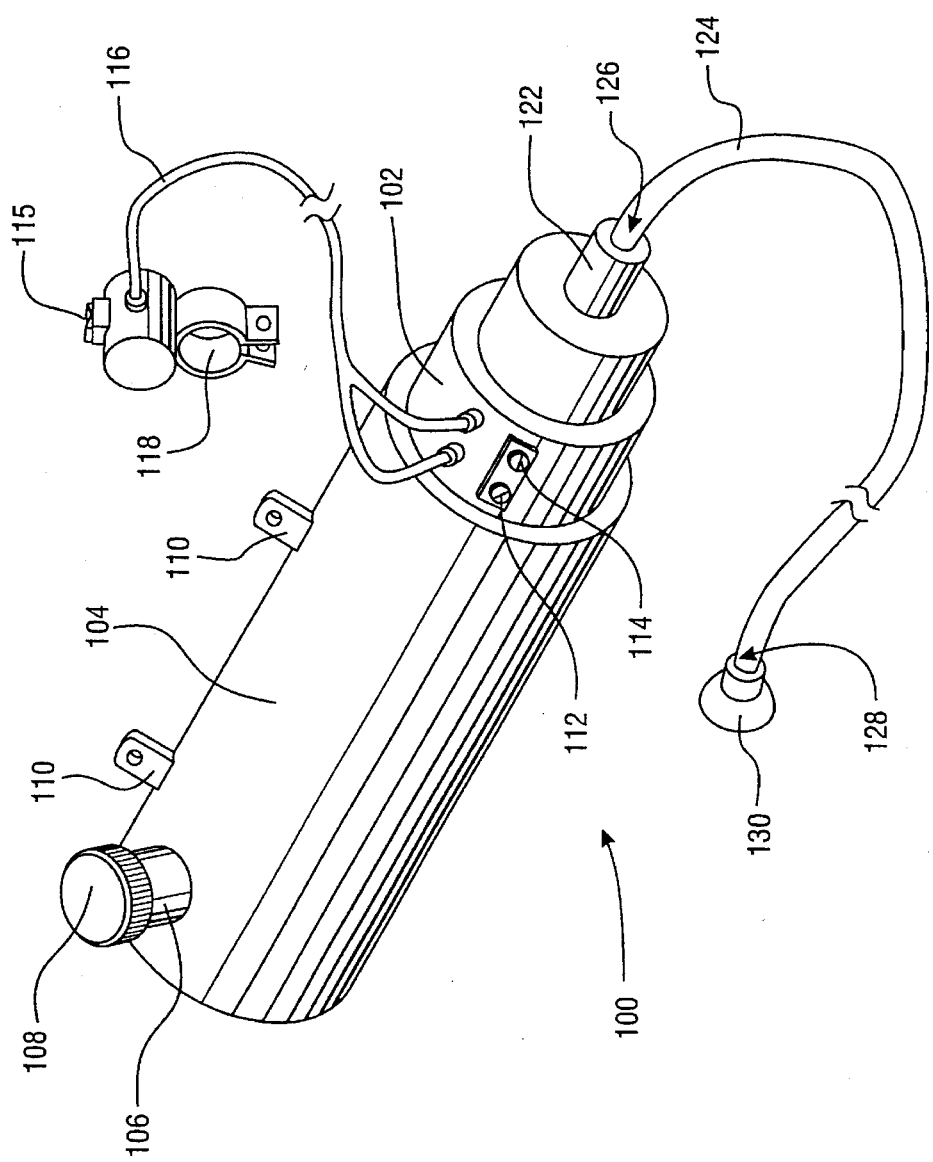
FIG. 1 is a front and side perspective view of an electrically pumped oiler according to a preferred embodiment of the present invention.

Referring now to FIG. 1, an electrically pumped oiler 100 is shown, according to a preferred embodiment of the present invention. The oiler 100 has a conventional electrically-operable pump 102 mounted to or otherwise associated, preferably manufactured as a built-in inclusive single unit, with a reservoir container 104 used for storage of oil (not shown). Preferably, the reservoir container 104 is manufactured of a lightweight metal material, such as aluminum, or durable plastic material. The reservoir container 104 is easily refilled with oil through a refill port 106, which refill port is preferably sealed with a sealing cap 108 that is threaded over the refill port 106 and removable therefrom. As such, the sealing cap 108 may be removed as desired to add oil to the reservoir container 104 through the refill port 106, thereby eliminating the requirement of disconnecting and reconnecting accessories from and to the oiler 100 when refilling of the reservoir container 104 is necessary. FIG. 1 shows the refill port 106 mounted on a side of the reservoir container 104, thereby illustrating a first preferred positioning of the refill port 106 on the container 104. In a preferred embodiment, the oiler 100 is bolted or otherwise attached through attachment ribs 110 to a frame member 301 of a conventional motorcycle 302 shown in broken lines for illustrative purposes in FIG. 3.

Figure 3:
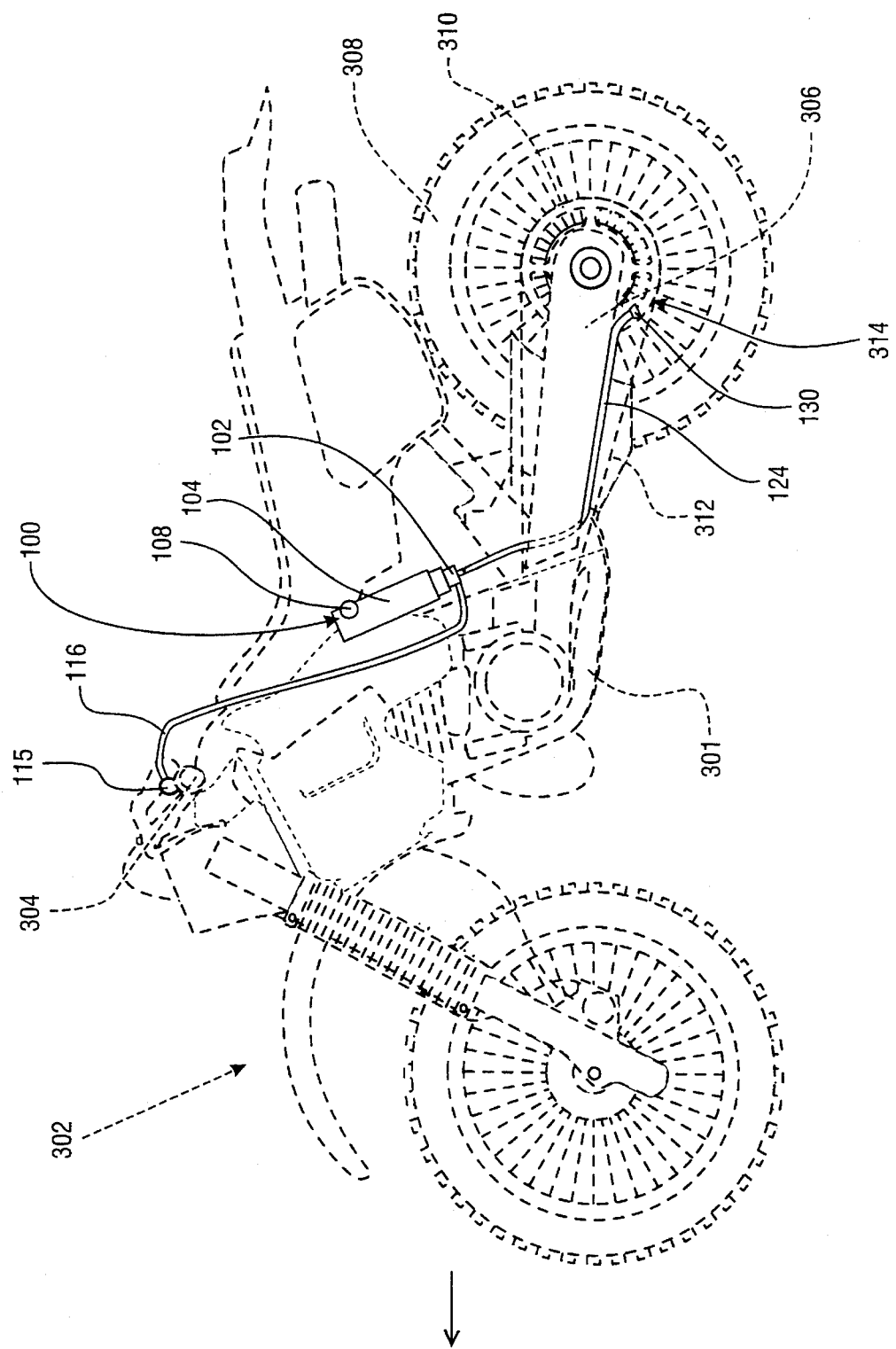
FIG. 3 is an elevational view of a preferred embodiment of the present invention affixed in operative position to a conventional motorcycle, which motorcycle is shown in broken lines for illustrative purposes only.

Operation of the pump 102 is conventional, similar to that of a conventional automobile windshield washer pump, for example. The pump 102 is powered in a conventional manner by electrically connecting power supply terminals 112, 114 to a motorcycle battery (not shown) or other power supply. A preferred embodiment of the pump 102 is activated by closing a conventional electrical switch 115, such as a toggle button for instance, which switch is electrically connected to the pump 102 with a length of wire 116 in a manner well-known in the electrical art, and which switch is preferably mounted with a bracket 118 to one side of a handlebar 304 of a conventional motorcycle 302, as shown in FIG. 3.

The pump 102 has an input port 202 (see FIG. 2) through which oil stored in the reservoir container 104 enters the pump 102 and subsequently is urged by the pump 102 through an output port 122. In a preferred embodiment, a flexible conduit 124 is connected at a first end 126 to the output port 122. The oil which is urged by the pump 102 through the output port 122 is discharged through a second end 128 of the flexible conduit 124. In a preferred embodiment of the present invention, a spray nozzle 130 with nozzle outputs 204 (see FIG. 2) is attached to the second end 128, thereby to cause the oil to discharge in the form of a widened spray or a fine mist, thereby minimizing dripping of the oil and minimizing slinging of droplets of oil which may otherwise fall onto and subsequently splatter from a swiftly moving drive chain.

Figure 2:
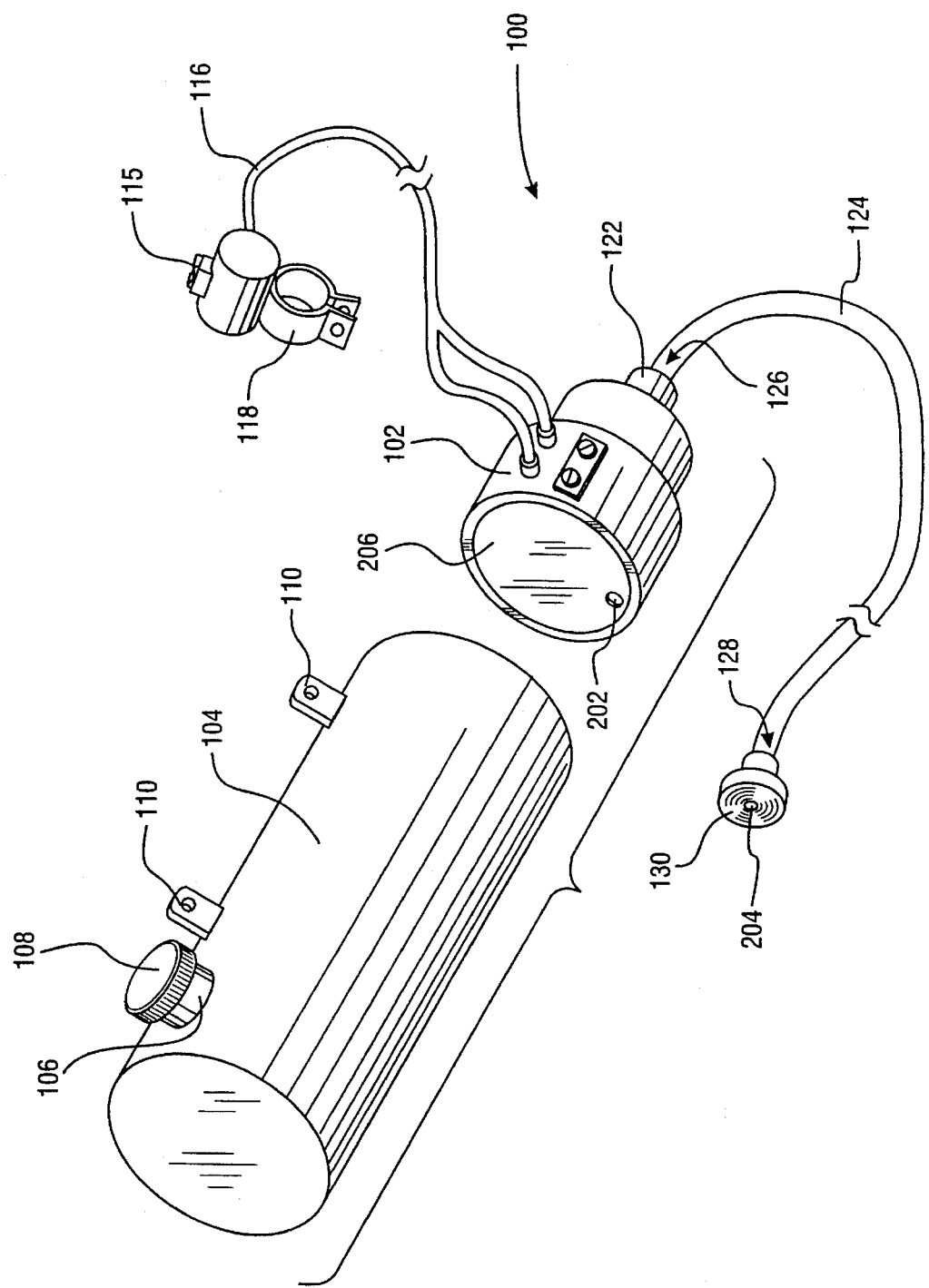
FIG. 2 is a rear and side perspective bracketed view of the electrically pumped oiler of FIG. 1, shown with a reservoir container removed from a pump, thereby to disclose an input port to the pump.

Referring to FIG. 2, a perspective view different than that of FIG. 1 of the electrically pumped oiler 100 is shown, for illustrative purposes only, with the reservoir container 104 separated from the electrically operable pump 102, thereby to disclose the input port 202 through which the oil flows from the reservoir container 104, in order to be pumped by the pump 102 in a manner well-known in the art. FIG. 2 shows the refill port 106 mounted on an end of the reservoir container 104, thereby illustrating a second preferred positioning of the refill port 106 on the container 104. In a preferred embodiment of the present invention, the input port 202 is defined near an edge of a wall 206, which wall separates the reservoir container 104 from the pump 102. One skilled in the art will recognize that the input port 202 is positionable in many predetermined locations to effect proper operation of the pump 102. In a preferred embodiment, the wall 206 may be designed to be angled away from the reservoir container 104, thereby to direct the flow of oil toward the input port 202.

FIG. 2 also shows the nozzle outputs 204 defined by the spray nozzle 130, which nozzle 130 is connected to the second end 128 of the flexible conduit 124. As shown, a preferred embodiment of the spray nozzle 130 fans radially outwardly from the nozzle outputs 204, thereby to discharge the oil which is urged by the pump 102 through the flexible conduit 124 and out of the nozzle outputs 204 in the form of a widened spray or fine mist. Preferably, the flexible conduit 124 and spray nozzle 130 is conventionally manufactured from a rubber material, a metal material, or a plastic material.

2. Operation of the Preferred Embodiment

In accordance with a preferred embodiment of the present invention, as shown in FIG. 3, the electrically pumped oiler 100 is affixed to the frame member 301 of a conventional motorcycle 302 (shown in broken lines), preferably with the reservoir container 104 positioned above the electrically operable pump 102, in order that gravity will urge the oil stored in the reservoir container into the input port 202 of the pump 102. The motorcycle 302 has a swing arm 306 onto which a rear wheel 308 is mounted along with an associated rear drive sprocket 310 and a drive chain 3 12. When the motorcycle 302 is moving forward, the drive chain meets the rear drive sprocket 310 at a position 314 and subsequently partially encircles the sprocket, thereby to provide drive means to the rear wheel.

The flexible conduit 124 of the oiler is preferably affixed behind and beneath the swing arm 306, thereby to direct the nozzle outputs 204 of the spray nozzle 130 generally toward the position 314 where the drive chain 312 meets the rear drive sprocket 310. Closing the electrical switch 115 mounted to the handlebar 304 activates the pump 102 to urge oil from the reservoir container 104 through the flexible conduit 124, thereby to be discharged at the nozzle outputs 204 into a fine mist or widened spray directed at the position 314, thereby to apply a fine mist of oil to the interior of the drive chain 312, which applied oil will be urged around the chain and the sprocket. Applying the oil in a fine mist or widened spray minimizes the amount of oil slung in a splattering manner from the chain due to centrifugal force experienced from a moving chain.

Thus, there has been shown and described an electrically operable oiler for discharging oil from a reservoir through a flexible conduit to a predetermined position, particularly for oiling the drive chain of a motorcycle while the motorcycle is in motion, which oiler fulfills all the objects and advantages sought therefore. Although the present invention is contemplated mainly for sport motorcycles and street motorcycles, the present invention may be used on other chain driven vehicles, such as dirt bikes and bicycles, for instance. Many changes, modifications, variations and other uses and applications of the subject invention will, however, become apparent to those skilled in the art after considering this specification and the accompanying drawings which disclose a preferred embodiment thereof. All such changes, modifications, variations and other uses and applications which do not depart from the spirit and scope of the invention are deemed to be covered by the invention which is limited only by the claims which follow.

What is claimed is:

1. An electrically pumped motorcycle drive chain oiler attachable to a frame member of a motorcycle having handlebars for steering, wherein the oiler comprises:

an electric pump having an input port and an output port;

a hollow container defining a reservoir for the storage of oil and having a container port, wherein said electric pump is fittingly affixed to said hollow container in a manner thereby to permit said oil from said reservoir to pass into said input port of said electric pump, to be urged by said electric pump through said output port of said electric pump;

an electric switch mountable to the handlebars for activating said electric pump; and a flexible conduit having a first and a second end, wherein said first end is attached to said output port of said electric pump; thereby to provide for positionable discharge of said oil from said pump through said second end when said pump is activated.

2. The electrically pumped oiler of claim 1, wherein said electric pump and said hollow container defining said reservoir are manufactured as a single unit.

3. The electrically pumped oiler of claim 1, wherein said hollow container further comprises:

a refill port with a sealing cap, from which said sealing cap may be removed, thereby to introduce said oil through said refill port and into said hollow container.

4. The electrically pumped oiler of claim 1, wherein said second end of said conduit further comprises:

a spray nozzle from which said oil is discharged as a widened spray.

5. The electrically pumped oiler of claim 4, wherein said widened spray is a fine mist.

6. The electrically pumped oiler of claim 1, further comprising mounting means for mounting said electric switch to said handlebars.

7. An electrically pumped motorcycle drive chain oiler attachable to a frame member of a motorcycle having handlebars for steering, wherein the oiler comprises:

an electric pump which is activated by an electric switch, wherein said electric pump further comprises:

a built-in reservoir in which oil is stored;

a discharge port through which oil from said built-in reservoir is urged by said pump when activated by said electric switch; and a flexible conduit having a first and a second end, wherein said first end is attached to said discharge port of said electric pump, through which conduit said oil passes when said pump is activated, thereby to be discharged through said second end which is positioned in a predetermined position.

8. The electrically pumped oiler of claim 7, wherein said electric pump and said built-in reservoir is manufactured as a single unit.

9. The electrically pumped oiler of claim 7, wherein said second end of said flexible conduit further comprises:

a spray nozzle from which said oil is discharged as a widened spray.

10. The electrically pumped oiler of claim 9, wherein said widened spray is a fine mist.

11. The electrically pumped oiler of claim 7, further comprising mounting means for mounting said electric switch to said handlebars.

12. The electrically pumped oiler of claim 7, wherein said built-in reservoir further comprises a refill port through which said stored oil is introduced into said built-in reservoir.

13. The electrically pumped oiler of claim 12, wherein said refill port further comprises a sealing cap which is removable to introduce said oil into said built-in reservoir.

* * * * *